United States Patent
Levy et al.

(10) Patent No.: US 12,459,641 B2
(45) Date of Patent: Nov. 4, 2025

(54) APPARATUS FOR SECURING PAYLOAD IN AERIAL DELIVERY

(71) Applicant: Flytrex Aviation Ltd., Tel Aviv (IL)

(72) Inventors: Rotem Izchak Levy, Shlomi (IL); Roman Dvorkin, Givatayim (IL); Tomer Gilad, Hod Hasharon (IL); Dmitri Osipov, Ramat Gan (IL); Amit Hadad, Givatayim (IL)

(73) Assignee: Flytrex Aviation Ltd., Tel Aviv (IL)

( * ) Notice: Subject to any disclaimer, the term of this patent is extended or adjusted under 35 U.S.C. 154(b) by 0 days.

(21) Appl. No.: 18/594,628

(22) Filed: Mar. 4, 2024

(65) Prior Publication Data

US 2025/0276791 A1    Sep. 4, 2025

(51) Int. Cl.
*B64D 1/10*    (2006.01)
*B64U 10/14*   (2023.01)
*B64U 101/64*  (2023.01)

(52) U.S. Cl.
CPC ............... *B64D 1/10* (2013.01); *B64U 10/14* (2023.01); *B64U 2101/64* (2023.01)

(58) Field of Classification Search
CPC ......... B64D 1/10; B64D 1/08; B64U 2101/64
See application file for complete search history.

(56) References Cited

U.S. PATENT DOCUMENTS

| | | | |
|---|---|---|---|
| 9,085,362 B1 * | 7/2015 | Kilian | B64U 30/21 |
| 11,122,925 B2 | 9/2021 | Shobe | |
| 11,305,889 B2 | 4/2022 | Janssen | |
| 11,319,064 B1 * | 5/2022 | Wittmaak, Jr. | B64D 9/003 |
| 2017/0038780 A1 | 2/2017 | Fandetti | |
| 2017/0203843 A1 * | 7/2017 | Chan | B64D 1/08 |
| 2020/0062399 A1 * | 2/2020 | Prager | B64D 1/22 |
| 2020/0288895 A1 | 9/2020 | Bennet et al. | |

* cited by examiner

*Primary Examiner* — Joshua D Huson
*Assistant Examiner* — Peter A Taraschi
(74) *Attorney, Agent, or Firm* — M&B IP Analysts, LLC (57) ABSTRACT

A system and method for payload securing and support in unmanned aerial delivery is presented. The system includes: a first member having a first connector configured to be connected to a first part of a UAV; a second member, having a second connector configured to be connected to a second part of the UAV; and a membrane coupled with the first member at a first edge and with the second member at a second edge, wherein the first member and the second member are configured to be deployed together in a first position relative to the vehicle and further configured to be deployed in a second position relative to the aerial vehicle such that the second position contacts a payload coupled to the aerial vehicle, providing support to the payload in a direction of travel of the aerial vehicle.

17 Claims, 9 Drawing Sheets

APPARATUS FOR SECURING PAYLOAD IN AERIAL DELIVERY

TECHNICAL FIELD

The present disclosure relates generally to unmanned aerial vehicles performing on-demand delivery, and specifically to a method and an apparatus improving payload securement and protection in payload delivery.

BACKGROUND

As drone technologies progress, there is a growing interest in utilizing drones for commercial use in the delivery of payload. Drones, also referred to as unmanned aerial vehicles (UAVs), can perform point to point delivery by flying above the ground, bypassing land vehicles, and avoiding traffic. Therefore, a UAV as opposed to a land vehicle, can take more efficient routes with less time delay resulting in a potential for more deliveries.

While deliveries via UAVs have advantages that are not possible with land vehicles, they are not without challenges. Delivering certain payloads with a UAV, for example, carries the risk of the payload being damaged during transit. Examples of such payloads include food, beverages, glassware, plasticware, ceramics, technological devices, fragile items, and the like. UAVs can experience an abundance of forces that causes the payload to have unwanted movement such as turbulence, wind shear, vibration, humans, animals, objects, etc. Such unwanted movements from the payload can translate into bumps, bruises, spills, leaks, cracks, and general damage overall.

Furthermore, such unwanted movement from the payload carries the risk that the UAV or its accessories will be damaged through undesired contact. Example damage areas of the UAV include its legs, fuselage, body, wings, blades, frame, circuitry, internal components, external components, and the like. Any point of contact in which the payload could touch the UAV, or its accessories would be susceptible for successive damage resulting in a reduction in UAV life and costly repairs or replacements.

Other concerns from the unwanted movement of a payload includes its effects on the movement and flight path of the UAV. One such concern is the dampening effect the payload could cause if not properly secured to the UAV. An unsecured or poorly secured payload could act as a dampener reducing the efficiency of the UAV as it would need to overcompensate the loss of thrust, power, and or force caused by the payload acting as a dampener to fly at a targeted rate. An example of such a dampening effect occurring is when a UAV with a poorly secured payload exerts a thrust, such payload will dampen the thrust requiring more power to reach a thrust of that of an unaffected UAV. More power consumption to reach a desired thrust results in less power efficiency which reduces the maximum potential speed of the UAV, the amount of time the UAV could operate without recharging or refueling, the battery cycle life, the operating life of the UAV, the operating life of any part of the UAV, and the like.

Yet another concern of the unwanted movement of a payload is the oscillation effect such an unsecured or poorly secured payload would have on the UAV. Any one of an abundance of factors could cause the payload to move independently of the UAV such as wind shear, turbulence, vibration, the UAV itself, gravity, thrust, drag, momentum, tension, compression, and the like. Any such unwanted movement can change the center of gravity of the UAV and or exert an unwanted force on the UAV requiring thrust adjustments for the UAV to remain balanced and or on course. Such adjustments from forces relating to unwanted payload movement reduce the power efficiency of the UAV, the amount of time the UAV could operate, the operating life of the battery, UAV, and its parts, and the flight precision of the UAV. Regarding flight precision, a more precise UAV flight path is ideal as unwanted movements from a payload could, for example, result in the UAV crashing into a building, flying into restricted air space, or colliding with other aerial vehicles.

As currently designed, some UAVs attempt to secure payloads with rigid members. However, securing such payloads with rigid members is not ideal as it does not allow for impacts from the UAV that are transferred to the payload to be absorbed and mitigated. For example, the delivery of fragile payloads (e.g., glassware, beverages, food, technological devices, etc.) could easily be damaged or spilled with any and all impacts to the drone.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, payload securement apparatus may include a first member having a first connector configured to be connected to a first part of an aerial vehicle. Payload securement apparatus may also include a second member, having a second connector configured to be connected to a second part of the aerial vehicle, where the second part is separated by a fixed distance from the first part. Apparatus may furthermore include a membrane, coupled with the first member at a first edge of the membrane and coupled with the second member at a second edge of the membrane, where the first member and the second member are configured to be deployed together in a first position relative to the vehicle and further configured to be deployed in a second position relative to the aerial vehicle such that the second position contacts a payload coupled to the aerial vehicle, providing support to the payload in a direction of travel of the aerial vehicle. Other embodiments of this aspect include corresponding computer systems, apparatus, and computer programs recorded on one or more computer storage devices, each configured to perform the actions of the methods.

Implementations may include one or more of the following features. Payload securement apparatus may include: a plurality of members, where each member is coupled with the aerial vehicle. Payload securement apparatus may include: a plurality of membranes, where each membrane is coupled with a pair of members of the plurality of members. Payload securement apparatus where a group of members of the plurality of members are configured to be deployed in a landing position. Payload securement apparatus may include: the first member having a plurality of sections, each section connected to at least another section with a connector configured to allow for movement at a predetermined range. Payload securement apparatus where the first member and the second member are further configured to be deployed in a landing position supporting the aerial vehicle. Payload securement apparatus where the membrane includes any one of: a thermal insulative layer, a hydrophobic layer, an absorbent layer, a mesh, a fabric, a cord, a net, and a combination thereof. Payload securement apparatus where the membrane includes an elastically deformable material. Payload securement apparatus may include any one of: an adhesive, a magnet, a hook, a ring, a hook and loop fastener member, a fastener member, a clamp, and a combination thereof. Implementations of the described techniques may include hardware, a method or process, or a computer tangible medium.

In one general aspect, method may include receiving a payload delivery request, the payload delivery request including a payload receival location and a payload delivery location. Method may also include configuring the aerial vehicle to support the payload, where the aerial vehicle includes a plurality of members coupled with a membrane, such that the payload is supported by the membrane when the plurality of members are deployed in a first, position. Method may furthermore include configuring the aerial vehicle to release the payload at the delivery location, by deploying the plurality of members in a second, open position. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include an apparatus which secures a payload utilizing an unmanned aerial vehicle (UAV), also referred to as a drone. In an embodiment the payload securement apparatus includes an elastic membrane coupled with at least a first member and a second member of the UAV, such that the membrane substantially encompasses the area between the members. In some embodiments, the membrane is a plurality of membranes, wherein each membrane is attached to a different pair of members.

In certain embodiments the payload securement apparatus includes the members and the membrane and is configured to be coupled with the body of the UAV. In some embodiments, the payload securement apparatus includes the membrane and a plurality of coupling members configured to be coupled with the members of the UAV. In an embodiment, the coupling members include any one of an adhesive, a magnet, a hook, a ring, a hook and loop fastener, a fastener member, a clamp, and the like.

In certain embodiments, the membrane is a non-rigid, elastically deformable material. In some embodiments, the membrane includes any one of a thermal insulative layer, a hydrophobic layer, an absorbent layer, a mesh, a fabric, a cord, a net, and the like. In some embodiments, the members coupled with the body of the UAV are configured
to be deployed in an open position and a closed position, relative to the UAV. The closed position being configured to secure the payload to the UAV. In an embodiment, in the closed position, the membrane substantially envelops the payload. In an embodiment, the open position is configured to deploy when landing the UAV, when releasing the securement of the payload, both, etc.

This is advantageous in certain embodiments, as a non-rigid membrane securing a payload reduces the magnitude of damage the payload could receive or emit (i.e., to the drone, structure, human, or other aerial vehicle, etc.) and increases the power efficiency by reducing unwanted payload movement (i.e., dampening effect or oscillation effect, etc.). Furthermore, the payload securement apparatus being configured to deploy the open and closed positions is advantageous as it allows for a simple, light, and efficient UAV design.

In some embodiments, some members are configured to include landing pads which are coupled at the end of members. In other embodiments, these landing pads are coupled to the underside of a member so that they are exposed and facing the ground when the member is configured in the closed position.

This is advantageous in some embodiments, as landing pads reduce the risk of UAV damage when landing, and especially in the event of a forced or unexpected landing. Furthermore, landing pads ensure that the UAV is stable when not airborne, according to an embodiment. Additionally, in certain embodiments, the inclusion of landing pads provides fine degrees of weight calibration to increase airborne effectiveness.

Figure 1A:
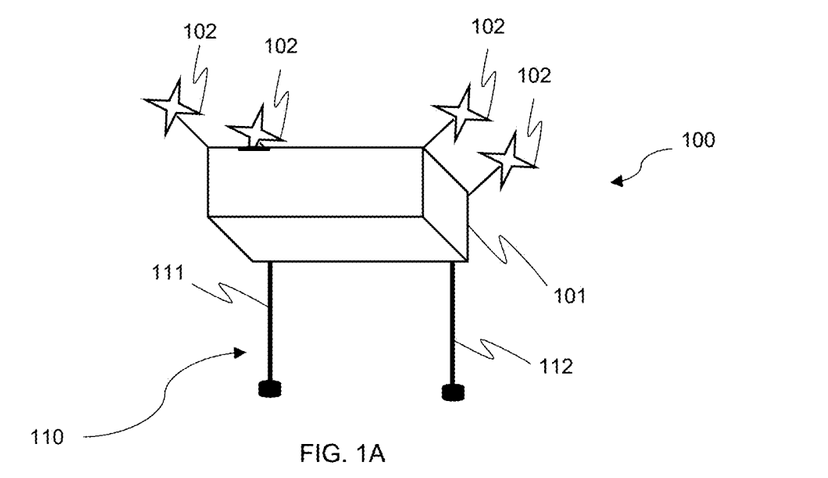
FIG. 1A is an example diagram of an unmanned aerial vehicle (UAV) diagram utilized to describe the various disclosed embodiments.

FIG. 1A is an example diagram of an unmanned aerial vehicle (UAV) diagram 100 utilized to describe the various disclosed embodiments. In an embodiment, the UAV diagram 100 includes a UAV body 101, a plurality of propellers 102, a first member 111, and a second member 112. In some embodiments, the plurality of members (i.e., first member 111 and second member 112) are in an open position 110.

According to an embodiment, the configuration of the propellers 102 relative to the UAV body 101 varies. The actual number of propellers constituting the plurality will vary, according to an embodiment, based on factors such as: a size of the UAV, a dimension of the UAV, a total weight of the UAV, a desired flight speed, a combination thereof, and the like.

In an embodiment, propellers 102 are constructed of known materials, such as those commonly categorized as: "plastics," "metals," "carbon fiber composites," any combination thereof, and the like.

In some embodiments, members contained within the plurality of members serve multiple purposes. According to an embodiment, a member is utilized for: an attachment point for a payload containment membrane (as discussed in more detail herein), assisting with in-flight stabilization actively (e.g., motion-driven) or passively (e.g., by acting as a counterweight), providing landing functionality (e.g., as landing legs), providing unit stabilization on the ground, any combination thereof, and the like.

Figure 1B:
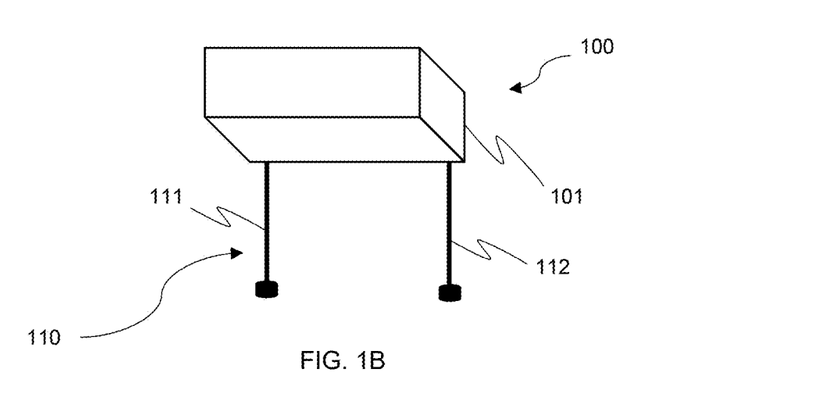
FIG. 1B is an example diagram of the UAV body with members in an open position, utilized to describe the various disclosed embodiments.

FIG. 1B is an example diagram of the UAV body 100 with members in an open position, utilized to describe the various disclosed embodiments. According to an embodiment, the first member 111 and the second member 112 are in an open position when the members extend away from the UAV body 101. In some embodiments, the first member 111 and the second member 112 are configurable in a fully open position 110, a partially open position, etc., such that when in the partially open position, the members extend away from the UAV body 101 less than when the members are in the fully open position.

Figure 1C:
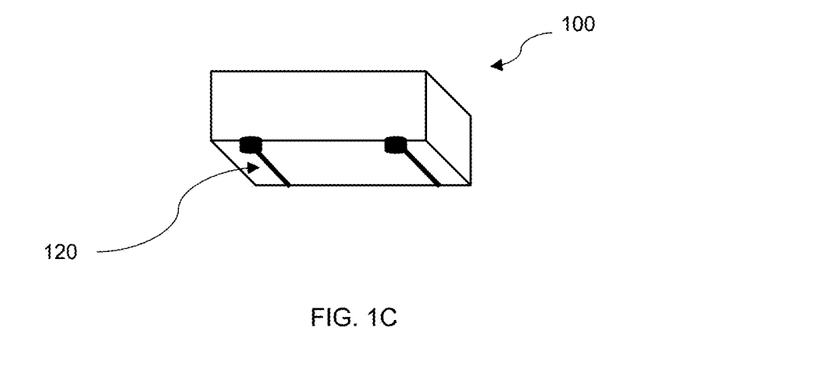
FIG. 1C is an example diagram of the UAV body with members in the closed position, utilized to describe the various disclosed embodiments.

FIG. 1C is an example diagram of the UAV body 100 with members in the closed position, utilized to describe the various disclosed embodiments. In some embodiments, the plurality of members 111 and 112 are in a closed positioned 120. In an embodiments, the members are in a fully closed position 120, a partially closed position, etc. For example, according to an embodiment, in a fully closed position 120 the members extend towards the UAV body 101. In an embodiment, in a partially closed position, the members extend towards the UAV body 101 less than in a fully closed position 120. In certain embodiments, a predetermined position of the first member 111 and the second member 112 is utilized for any one of: a fully closed position, a partially closed position, a partially open position, and a fully open position.

Figure 2A:
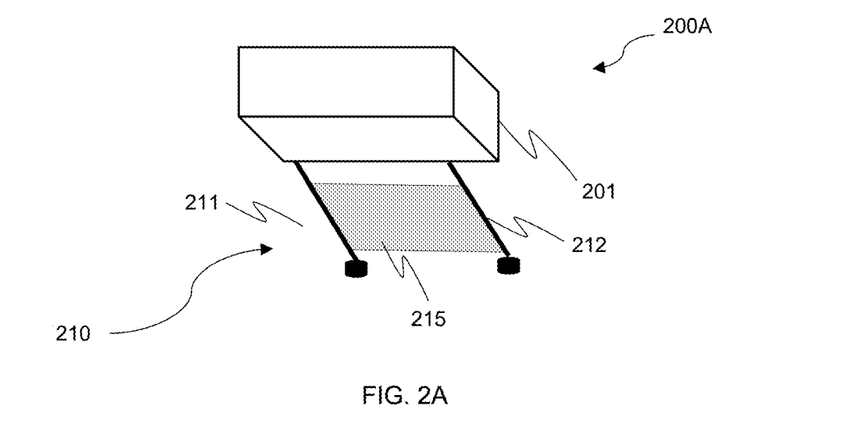
FIG. 2A is an example diagram of a payload securement apparatus in an open position coupled with a UAV body, implemented according to an embodiment.
Figure 2B:
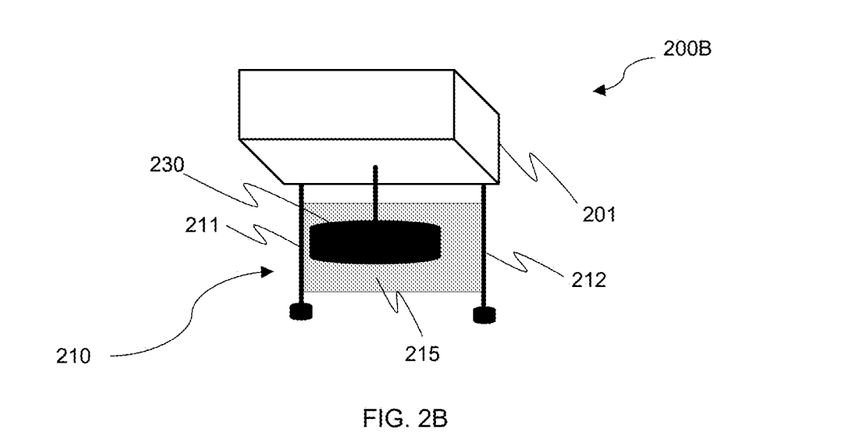
FIG. 2B is an example diagram of a payload in a supported position, implemented in accordance with an embodiment.

FIG. 2A is an example diagram 200A of a payload securement apparatus in an open position 210 coupled with a UAV body 201, implemented according to an embodiment. FIG. 2B is an example diagram 200B of a payload in a supported position, implemented in accordance with an embodiment. In some embodiments the payload securement apparatus includes a first member 211, a second member 212, and a membrane 215. In an embodiment, the membrane 215 is attached to the pair of members. In another embodiment the membrane is coupled with the pair of members such as through coupling members, hooks, fasteners, and the like.

In an embodiment, when the UAV is in an open position 210, a payload is receivable by the UAV for securing by the payload securement apparatus. In some embodiments, a UAV is configured to hover above a pickup site. In an embodiment, the UAV is further configured to expel a cord, line, rope, etc., which is retractable. In certain embodiments, the cord includes an attachment, such as a hook, magnet, and the like, which is configured to attached a payload to the cord.

According to some embodiments, the plurality of members 211 and 212 are configured to a first supporting position (e.g., the closed position), and a second unsupported position (e.g., the open position). In an embodiment, the first supporting position is configured such that the members are extended towards the UAV body 201, thereby having the membrane 215 providing support to a payload (e.g., applying a normal force with the direction of movement of the UAV, against the direction of a drag force, etc.).

In some embodiments, in the second unsupported position the members extend away from the UAV body 201, such that the membrane 215 does not make contact with the payload, thereby providing no support. In an embodiment, the UAV is configured to reposition the members to adjust a direction in which support is provided (e.g., by changing the angle of the membrane 215 relative to the payload).

In an embodiment, the position of the members provides support (or no support) relative to the payload position. For example, according to an embodiment, a payload 230 is supported by a membrane 215 when the first member 211 and the second member 212 are in a supporting position, such that the payload is supported by the membrane 215 (i.e., the membrane applies a force on the payload which is substantially opposite to the direction of a drag force applied on the payload, where the drag force is substantially opposite to the direction of flight of the UAV body 201).

In certain embodiments, the members 211 and 212 are positioned at a front section of the UAV, middle section of the UAV, back section of the UAV, etc. In some embodiments, front and back sections are determined based on a direction in which the UAV is navigating in a three dimensional space (e.g., front is towards the direction of movement).

In some embodiments, the UAV is configured to reposition the members based on a detected drag force. In an embodiment, utilizing a mesh net for the membrane 215 reduces drag in a supporting position. In certain embodiments, the UAV is configured to reposition the members based on a dynamic parameter of the UAV. For example, in an embodiment, the UAV is configured to reposition the members based on a detected dynamic parameter (e.g., roll, pitch, yaw, a combination thereof, and the like), such that the repositioning of the members positions the membrane 215 to support a payload 230 such that the payload remains parallel, or substantially parallel to the ground.

According to an embodiment, the drone is configured to retract the cord with the attached payload towards the UAV body 201. In such an embodiment, it is advantageous to then configured the drone to secure the payload, for example by configuring the first member 211 and second member 212 to reposition to a closed position as discussed in FIG. 3A below.

Figure 3A:
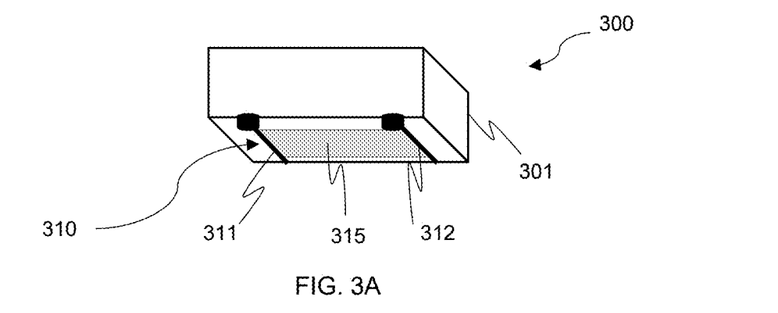
FIG. 3A is an example diagram of a payload securement apparatus in a closed position, coupled with a UAV.

FIG. 3A is an example diagram 300 of a payload securement apparatus in a closed position 310, coupled with a UAV 301. In some embodiments, the payload securement apparatus includes a first member 311, a second member 312, and a membrane 315. FIG. 3A depicts a UAV 301 with the payload securement apparatus in a closed position 310 without a payload. According to an embodiment, it is advantageous to have the payload securement apparatus in a closed position for example when the UAV is navigating between an origin and destination and not carrying a payload. This results, according to an embodiment, in reduced drag and therefore improves flight capability.

Figure 3B:
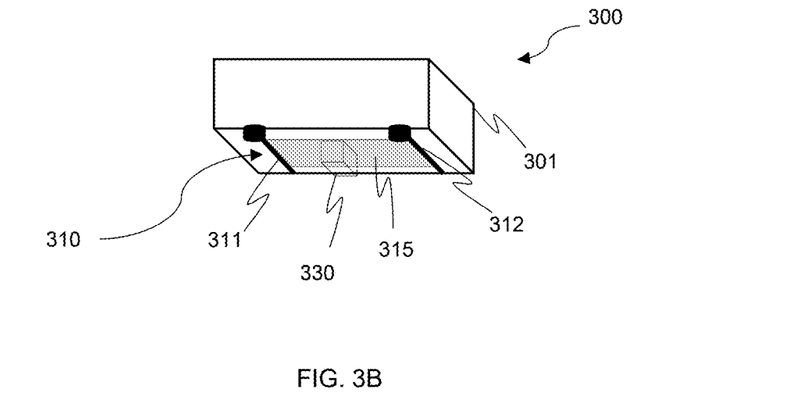
FIG. 3B is an example diagram of the payload securement apparatus in the closed position coupled with the UAV securing a payload.

FIG. 3B is an example diagram 300 of the payload securement apparatus in the closed position 310 coupled with the UAV 301 securing a payload 330. In an embodiment, the UAV 301 is configured to retract a payload while the UAV is hovering. This is advantageous as it does not require the UAV to land, according to an embodiment. Landing a commercial UAV, especially near an uncontrolled civilian population, is dangerous, according to an embodiment. Large rotor blades which spin at high speeds are dangerous, and therefore landing is typically limited to specific areas, or in emergency situations. It is more advantageous, according to an embodiment, to avoid landing the UAV where possible. Therefore, picking up a payload while hovering above ground at a distance is advantageous, in an embodiment.

In certain embodiments, a UAV 301 is configured to deploy a cord with an attachment, such as a hook, magnet, and the like. In an embodiment, the attachment is configured to attached to a payload, for example by attaching a hook to handles of the payload.

In an embodiment, the UAV 301 is configured to retract the cord towards the UAV 301. In some embodiments, in response to detecting that retraction is complete, the UAV 301 is configured to position the first member 311 and the second member 312 in a closed position 310, which results in a membrane 315 enveloping, at least partially, a payload 330.

In an embodiment, the membrane 315 includes an elastic material, such that when the first member 311 and second member 312 extend from the open position to the closed position 310, the membrane 315 is stretched to accommodate the shape of the payload 330.

Figure 4A:
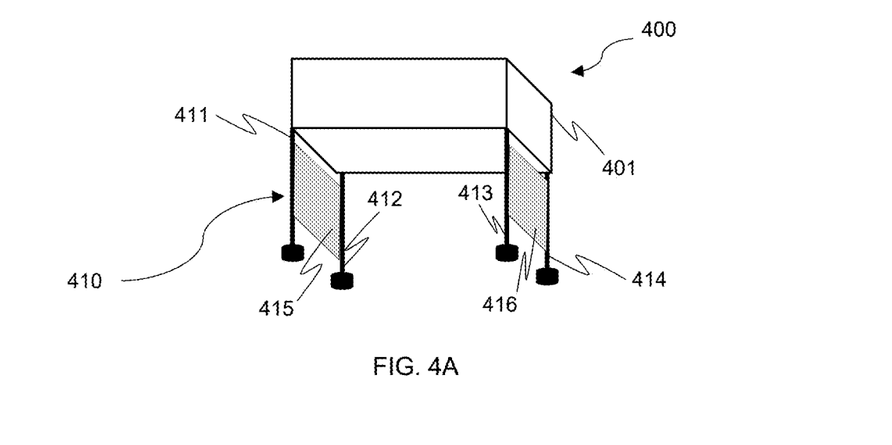
FIG. 4A is an example diagram of a payload securement apparatus in an open position coupled with a UAV body, implemented according to another embodiment.

FIG. 4A is an example diagram 400 of a payload securement apparatus in an open position 410 coupled with a UAV body 401, implemented according to another embodiment. In some embodiments, the payload securement apparatus includes a plurality of members and a plurality of membranes. In an embodiment, a first group of member of the plurality of members is attached, connected, coupled, and the like, to a first membrane, and a second group of the plurality of members is attached, connected, coupled, and the like, to a second membrane.

According to an embodiment, the plurality of members includes a first member 411, a second member 412, a third member 413, and a fourth member 414. In an embodiment, the plurality of membranes includes a first membrane 415 and a second membrane 416. In an embodiment, the first membrane 415 is attached, connected, coupled, and the like, to the first member 411 and to the second member 412. In certain embodiments, the third member 413 and fourth member 414 are connected, coupled, attached, and the like, to the second membrane 416.

In some embodiments, a membrane of the plurality of membranes includes material which is different from material of another membrane of the plurality of membranes. For example, according to an embodiment, a first membrane includes a woven net of synthetic fibers while a second membrane includes a malleable plastic, rubber elastic, combinations thereof, and the like.

In certain embodiments, some members of the plurality of members have multiple coupling points. In some embodiments, members of the plurality of members have a single coupler connecting the member to the body of the UAV.

Figure 4B:
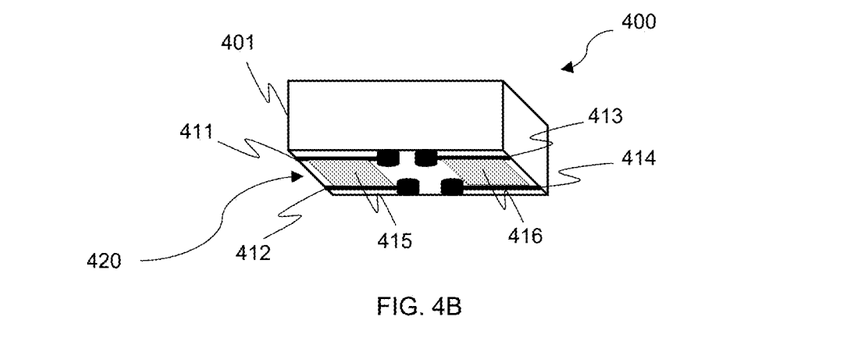
FIG. 4B is an example diagram of a payload securement apparatus in a closed position coupled with a UAV body.

FIG. 4B is an example diagram 400 of a payload securement apparatus in a closed position 420 coupled with a UAV body 401. According to an embodiment, the securement apparatus includes two pairs of securement devices-a first device including a first member 411, a second member 412, and a first membrane 415, and a second device including a third member 413, a fourth member 414, and a second membrane 416.

In an embodiment, the UAV 401 is configured to position each securement device in a closed position 420, such that the member of the plurality of members extend towards the UAV 401. In some embodiments, the closed position of a first securement device overlaps with the closed position of the second securement device.

In such embodiments, it is advantageous to position each securement device in the closed position one at a time (e.g., position the first securement device in a closed, or partially closed, position, and only then position the second securement device in a closed, or partially closed, position).

Figure 4C:
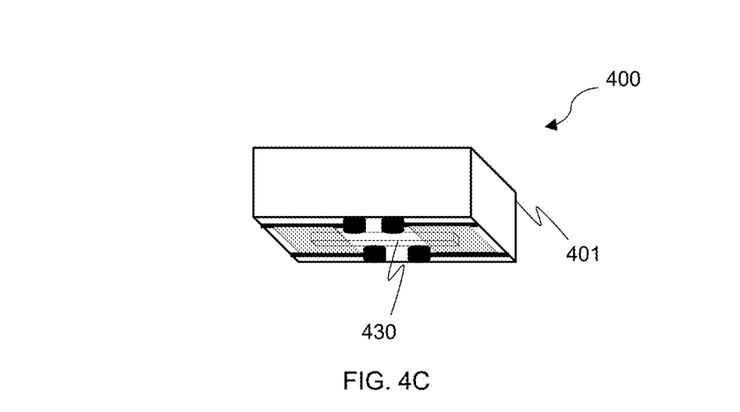
FIG. 4C is an example diagram of a payload securement apparatus in a closed position coupled with a UAV body securing a payload.

FIG. 4C is an example diagram 400 of a payload securement apparatus in a closed position 420 coupled with a UAV body 401 securing a payload 430. According to an embodiment, the payload 430 is retracted towards the UAV body 401. In an embodiment, when retraction is complete, the UAV is configured to position the payload securement apparatus to a closed position, a partially closed position, and the like.

In some embodiments, retraction is complete when a cord is fully retracted, after retraction occurs for a predetermined amount of time, when a presence sensor configured to sense presence of a payload senses the payload 430, a combination thereof, and the like.

According to an embodiment, each securement device of the payload securement apparatus is configured to a closed position simultaneously, independently, etc. In an embodiment, when a UAV reaches a destination, the payload securement apparatus is configured to reposition from the closed position to an open position. In the open position, according to an embodiment, the UAV is configured to release the payload 430, for example by releasing the cord attached to the payload 430.

Figure 5A:
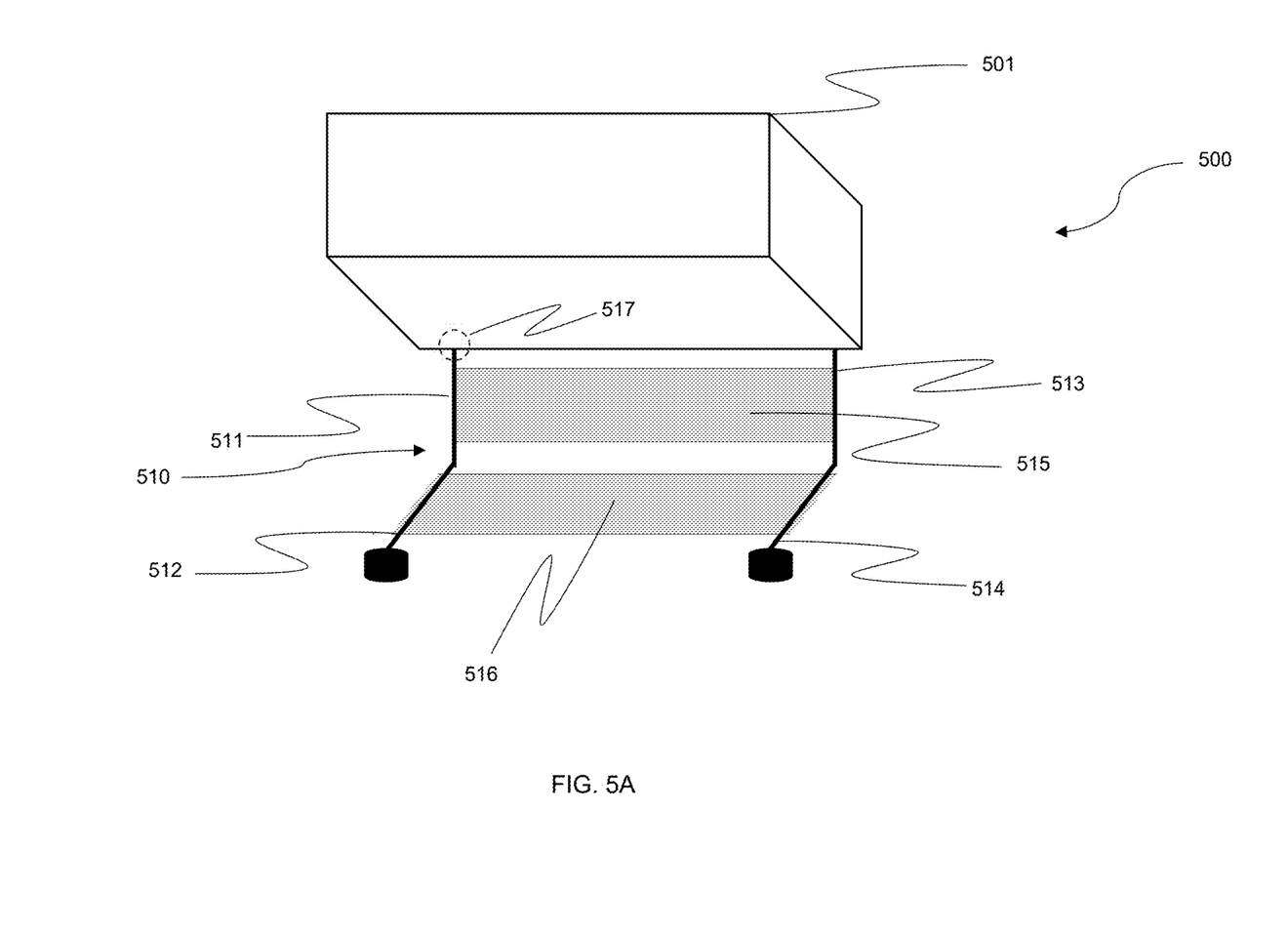
FIG. 5A is an example diagram of a payload securement apparatus in a first position of an open position coupled with a UAV body.

FIG. 5A is an example diagram 500 of a payload securement apparatus in a first position of an open position 510 coupled with a UAV body 501. In an embodiment, the plurality of members have a plurality of sections such that each section is configured to allow for movement at a predetermined range, as detailed below.

In an embodiment, a first membrane 515 is coupled with a first section of the first member 511 and the first section of the second member 513 and a second membrane 516 is coupled with a second section of the first member 512 and a second section of the second member 514.

Additionally, in an embodiment, the first section of the first member 511 is coupled with the second section of the first member 511, and the first section of the first member 511 is further coupled with, connected to, etc. the UAV body 501 at connector 517.

In some embodiments, the first section of the second member 513 is coupled with a second section of the second member 514, and the first section of the second member 513 is further coupled with, attached to, etc. the UAV body 501. In some embodiments, section members are coupled on an axis, which allows the sections to move relative to one another on a plane. In other embodiments, the sections are fixed in place, such that any movement is a result of the entire member moving.

According to an embodiment, the plurality of sections of the plurality of members having different predetermined ranges of motion allowing for different angles at which a payload could be secured and different cavities in which a payload is encapsulated. In certain embodiments, the first membrane 515 an the second membrane 516 are a single membrane, such that all sections of the first member and the second member are attached to the single membrane.

In an embodiment, sections of the first member are attached to the single membrane at a first edge, and sections of the second member are attached to the single membrane at a second edge, which is not the first edge. In some embodiments, the membrane is rectangular, and the first edge is a side of the rectangle which is opposite to the second edge.

Figure 5B:
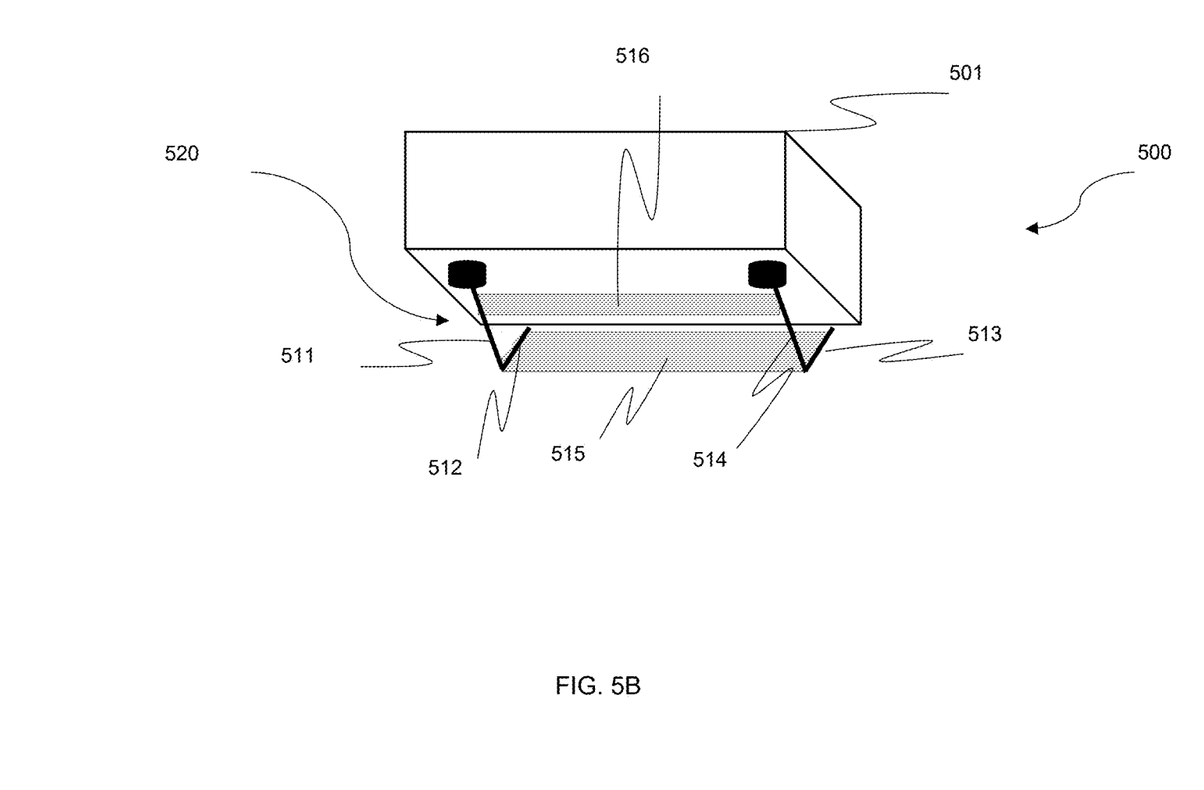
FIG. 5B is an example diagram of the payload securement apparatus in a closed position coupled with the UAV body configured to secure a payload.

FIG. 5B is an example diagram 500 of the payload securement apparatus in a closed position 520 coupled with the UAV body 501 configured to secure a payload. According to an embodiment, the UAV body is connected, for example via an actuator, to each of the first section of the first member 511 and the first section of the second member 513. In an embodiment, the actuator is configured to move to a first position, such that in the first position the first section 511 is in the open position. In some embodiments, the actuator is configured to move to a second position, such that in the second position the first section 511 is in the closed position.

Figure 6A:
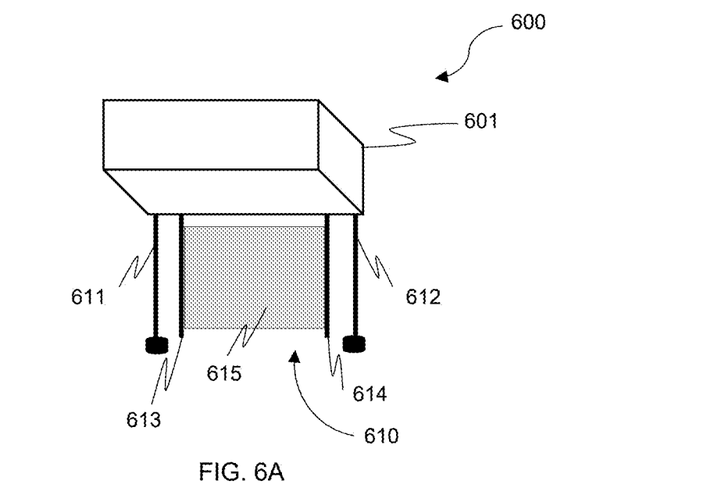
FIG. 6A is an example diagram of a payload securement apparatus in an open position coupled with the UAV body.

FIG. 6A is an example diagram 600 of a payload securement apparatus in an open position 610 coupled with the UAV body 601. In an embodiment, the payload securement apparatus comprises a plurality of members, such as first member 613 and second member 614. In an embodiment, the UAV body 601 is further coupled with landing members, such as first landing member 611 and second landing member 612.

In an embodiment, the plurality of members are utilized for securing a payload as an element of the payload securement apparatus, while the landing members are utilized for providing support for the UAV body 601 when the drone is landed.

In certain embodiment, the members 613 and 614 are utilized in providing support for the drone body 601 in a landed position. In such embodiments, the landing members 611 and 612 are not required. In certain embodiments, the member 613 and 614 provide additional support to the UAV body 601, in addition to support provided by the landing members 611 and 612.

According to an embodiment, a membrane 615 is coupled with the members 613 and 614 of the payload securement apparatus. In an embodiment, the members 613 and 614 are configured to move, for example by affixing the each of the members 613 and 614 to an actuator, a plurality of actuators, etc. In some embodiments, the landing members 612 and 613 are fixed, i.e., their position cannot be altered.

Figure 6B:
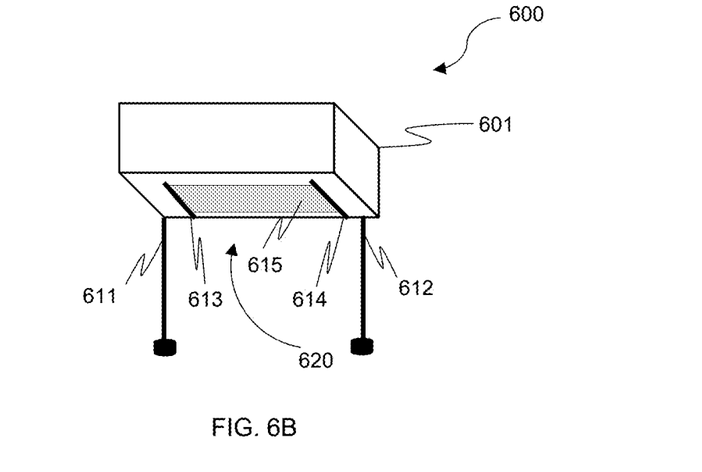
FIG. 6B is an example diagram of the payload securement apparatus in a closed position coupled with the UAV body.

FIG. 6B is an example diagram 600 of the payload securement apparatus in a closed position 620 coupled with the UAV body 601. In an embodiment, the payload securement apparatus is configured to deploy in a closed position 620 to secure a payload, such that the members 613 and 614 are configured to extend towards the UAV body 601, while the landing members 611 and 612 are fixed in their position.

This is advantageous as the payload securement apparatus allows for depositing of a payload while the UAV is stabilized on the ground. according to an embodiment. Alternatively, in certain embodiments, the securement apparatus allows for delivery of payloads while the UAV is in the air.

Figure 7:
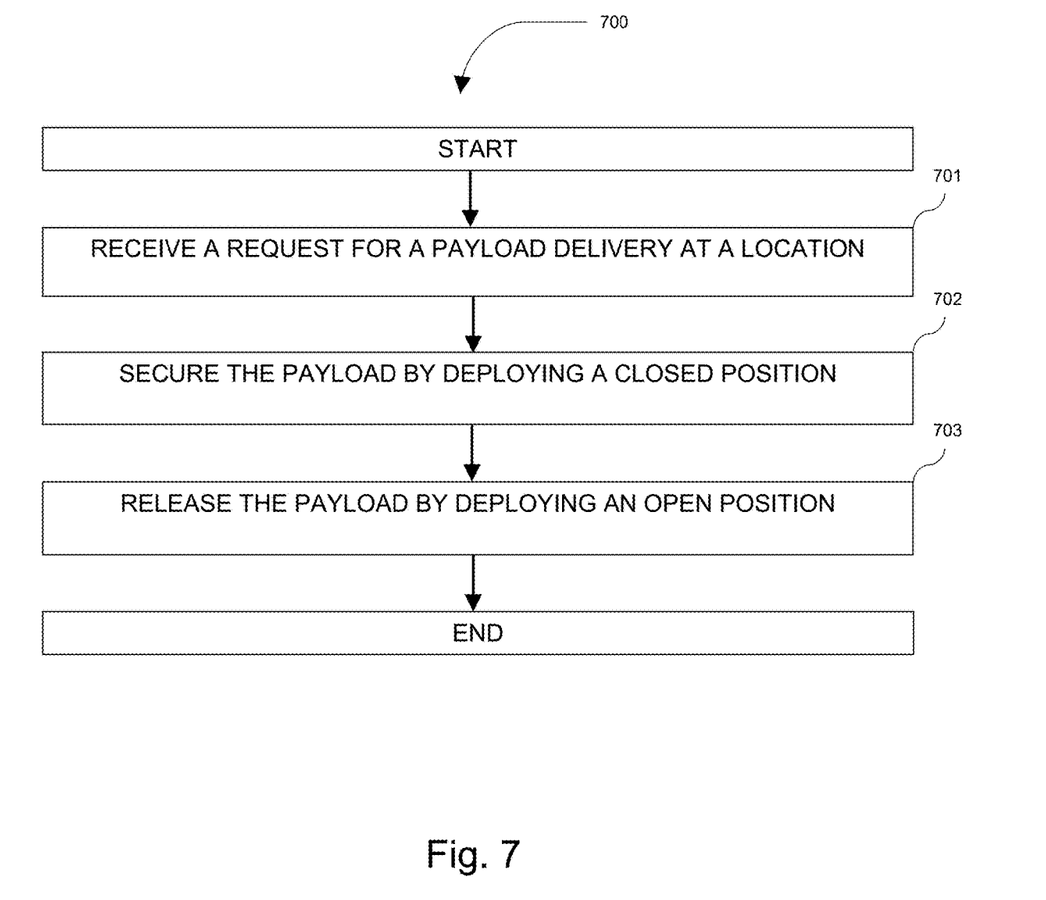
FIG. 7 is an example flowchart of a method for securing a payload to a UAV, implemented in accordance with an embodiment.

FIG. 7 is an example flowchart 700 of a method for securing a payload to a UAV, implemented in accordance with an embodiment.

At S701, a payload delivery request is received. In an embodiment, the payload delivery request includes a destination location. In some embodiments, the destination location includes coordinates, such as geospatial coordinates.

In an embodiment, the delivery destination location is within the service area of the UAV. According to an embodiment, the service area of a UAV is determined by: a total distance from an origin point, an airspace restriction, a distribution center location, a combination thereof, and the like.

In an embodiment, the payload delivery request further includes a volume of a payload, a weight of a payload, a temperature of a payload, a combination thereof, and the like.

At S702, the payload is secured to the UAV. In an embodiment, the UAV is configured to navigate to a pickup location. In some embodiments, the UAV is configured to hover at the pickup location and deploy a cord with an attachment, which is configured to receive, attach to, coupled with, and the like, a payload.

In an embodiment, the UAV is configured to position members of a payload securement apparatus in an open position, wherein the members extend away from the UAV in the open position.

In some embodiments, the UAV is configured to position members of the payload securement apparatus to a closed position. In an embodiment, the members are positioned in the closed position in response to determining that the payload is in possession of the UAV. In an embodiment, a payload is considered in possession of the UAV in response to determining that the UAV and payload are coupled together, for example via a cord, the cord having a hook attached to a handle of the payload.

According to an embodiment, a UAV includes a proximity sensor, which is triggered when the payload is proximate at a predetermined distance from the UAV. In such an embodiment, the UAV is configured to reposition the members of the payload securement apparatus to a closed position.

At S703, the payload is delivered. In an embodiment, delivering the payload includes configuring the UAV to navigate from a pickup location (e.g., origin location, and the like), to a destination location. In some embodiments, the UAV is configured to actively confirm the destination location.

For example, in an embodiment, the delivery request includes an identifier of a user device at the destination location. In some embodiments a network message, SMS message, push notification, combination thereof, and the like, are sent to the user device to confirm that delivery should be initiated.

In an embodiment, a navigation server communicatively coupled with the UAV is configured to send the message to the user device based on the identifier. In an embodiment, the UAV is configured to indicate to the navigation server that the UAV is at the destination, which triggers the navigation server sending the user device the confirmation message.

In some embodiments, where the user device sends a response to the navigation server, the navigation server is configured to instruct the UAV to deliver the payload. In an embodiment, delivering the payload includes configuring the members to position in an open position, and release the payload. In an embodiment, releasing the payload further includes releasing a cord which is attached to the payload, for example via a hook, magnet, and the like. In an embodiment, the cord is attached to the UAV with a winch which is configured to rotate in a first direction to retract the cord, and rotate in a second, opposite, direction, which releases the cord.

In certain embodiments, the payload is released from the cord at the destination. In response to releasing the payload, the UAV is configured to retract the cord. When the cord is fully retracted, according to an embodiment, the members of the payload securement apparatus are positioned to a closed position. In an embodiment, the UAV is then configured to navigate to a next pickup location, to the previous pickup location, to an origin location, to another destination location, etc.

In an embodiment, release of the payload is commenced: while the UAV is airborne (e.g., hovering above a destination location), or while grounded in a landed state.

Figure 8:
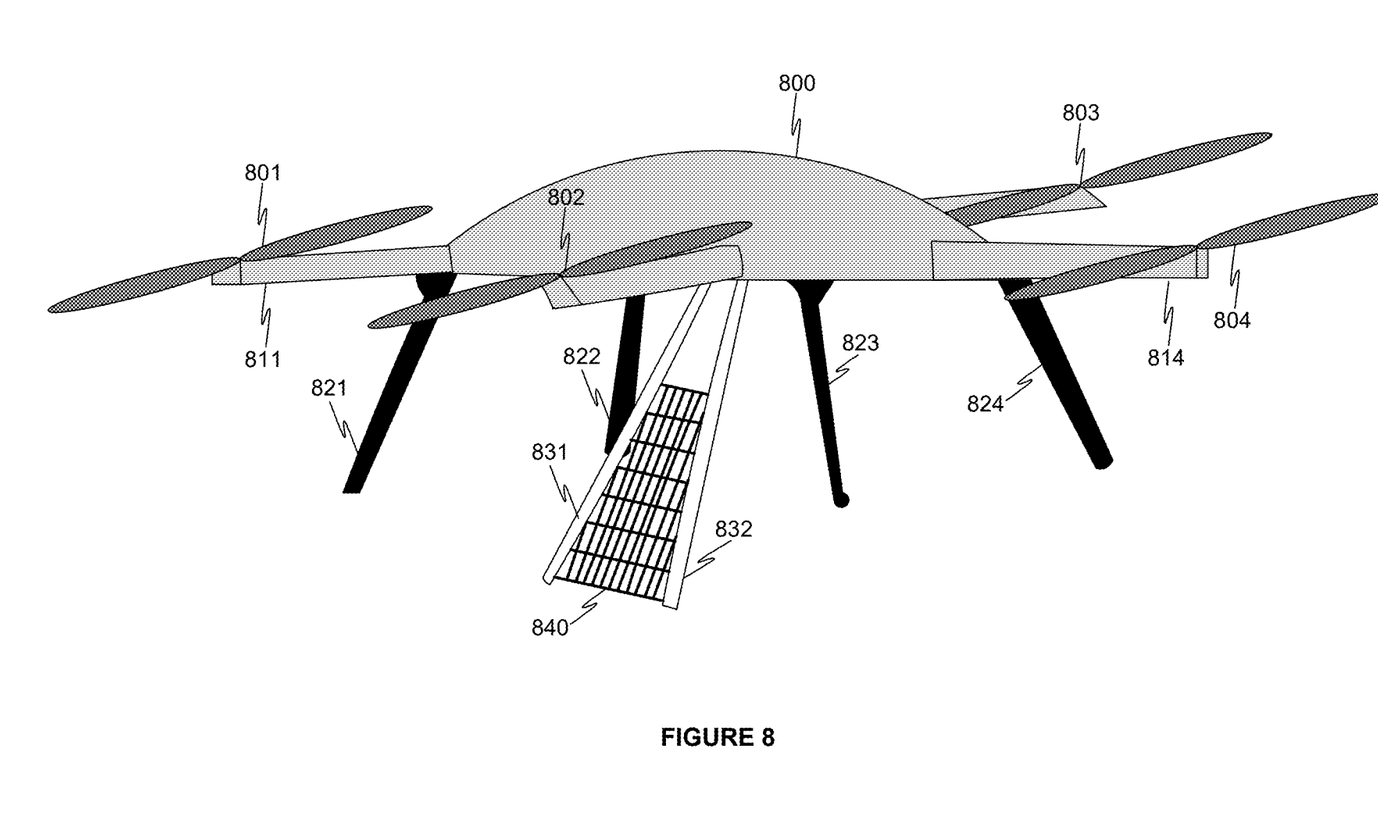
FIG. 8 is an example isometric diagram of an unmanned aerial vehicle (UAV) including a payload securement and supporting apparatus, utilized to describe an embodiment.

FIG. 8 is an example isometric diagram of an unmanned aerial vehicle (UAV) including a payload securement and supporting apparatus, utilized to describe an embodiment. According to an embodiment, a UAV 800 includes a plurality of arms, such as first arm 811, and fourth arm 814. In an embodiment, each arm of the plurality of arms includes an actuator, such as a motor, coupled to at least a propeller blade. For example, in an embodiment, the UAV 800 includes a plurality of propeller blades, such as first propeller 801 (which is coupled to first arm 811), second propeller 802, third propeller 803, and fourth propeller 804 (which is coupled to fourth arm 814).

In an embodiment, the UAV 800 further includes a plurality of landing members. In an embodiment, the landing members provide support for the UAV 800 body. According to certain embodiments, the UAV 800 includes a first landing member 821, a second landing member 822, a third landing member 823, and a fourth landing member 824.

In some embodiments, a landing member is coupled with another landing member to provide additional structural stability. In an embodiment, the UAV 800 is coupled with a payload support apparatus, including a first support member 831 and a second support member 832. In an embodiment, a support membrane 840 (e.g., a net) is extended between the first support member 831 and the second support member 832. In an embodiment, the support membrane 840 is coupled with the first support member 831 and the second support member 832.

In an embodiment, the first support member 831 and the second support member 832 are each coupled with the UAV 800 body. In some embodiments, the UAV 800 includes an actuator, such as a motor, which is configured to position the first support member 831 and the second support member 832 in a first position and in a second position, such that the first position provides support for a payload while the UAV 800 is in flight, thereby counteracting drag on the payload, by providing contact between the support membrane 840 and the payload.

In some embodiments, the second position corresponds to the support membrane 840 providing less, or no, support to a payload while the UAV 800 is in flight.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A payload securement apparatus comprising:
a first member having a first connector configured to be connected to a first part of an aerial vehicle, the first member having a plurality of sections, each section connected to at least another section with a connector configured to allow for movement at a predetermined range;
a second member, having a second connector configured to be connected to a second part of the aerial vehicle, wherein the second part is separated by a fixed distance from the first part; and a membrane, coupled with the first member at a first edge of the membrane and coupled with the second member at a second edge of the membrane, wherein the first member and the second member are configured to be deployed together in a first position relative to the vehicle and further configured to be deployed in a second position relative to the aerial vehicle such that the second position contacts a payload coupled to the aerial vehicle, providing support to the payload in a direction of travel of the aerial vehicle, and wherein the first position does not contact the payload.

2. The payload securement apparatus of claim 1, further comprising:
a plurality of members, wherein each member is coupled with the aerial vehicle.

3. The payload securement apparatus of claim 2, further comprising:
a plurality of membranes, wherein each membrane is coupled with a pair of members of the plurality of members.

4. The payload securement apparatus of claim 2, wherein a group of members of the plurality of members are configured to be deployed in a landing position, wherein in the landing position the group of members provide support to the aerial vehicle on the ground.

5. The payload securement apparatus of claim 1, wherein the first member and the second member are further configured to be deployed in a landing position supporting the aerial vehicle.

6. The payload securement apparatus of claim 1, wherein the membrane includes any one of: a thermal insulative layer, a hydrophobic layer, an absorbent layer, a mesh, a fabric, a cord, a net, and a combination thereof.

7. The payload securement apparatus of claim 1, wherein the membrane includes an elastically deformable material.

8. The payload securement apparatus of claim 1, further comprising any one of:
an adhesive, a magnet, a hook, a ring, a hook and loop fastener member, a fastener member, a clamp, and a combination thereof.

9. A method for supporting a payload in an aerial vehicle, comprising:
receiving by an aerial vehicle, a payload delivery request, the payload delivery request including a payload receival location and a payload delivery location;
configuring the aerial vehicle to support the payload, wherein the aerial vehicle includes a plurality of members coupled with a membrane, such that the payload is supported by the membrane when the plurality of members are deployed in a first, position;
configuring the aerial vehicle to release the payload at the delivery location, by deploying the plurality of members in a second, open position.

10. A payload securement apparatus comprising:
a first member having a first connector configured to be connected to a first part of an aerial vehicle;
a second member, having a second connector configured to be connected to a second part of the aerial vehicle, wherein the second part is separated by a fixed distance from the first part; and
a membrane, coupled with the first member at a first edge of the membrane and coupled with the second member at a second edge of the membrane, wherein the first member and the second member are configured to be deployed together in a first position relative to the vehicle and further configured to be deployed in a second position relative to the aerial vehicle such that the second position contacts a payload coupled to the aerial vehicle, providing support to the payload in a direction of travel of the aerial vehicle, wherein the first member and the second member are further configured to be deployed in a landing position supporting the aerial vehicle, and wherein the first position does not contact the payload.

11. The payload securement apparatus of claim 10, further comprising:
a plurality of members, wherein each member is coupled with the aerial vehicle.

12. The payload securement apparatus of claim 11, further comprising:
a plurality of membranes, wherein each membrane is coupled with a pair of members of the plurality of members.

13. The payload securement apparatus of claim 11, wherein a group of members of the plurality of members are configured to be deployed in a landing position, wherein in the landing position the group of members provide support to the aerial vehicle on the ground.

14. The payload securement apparatus of claim 10, further comprising:
the first member having a plurality of sections, each section connected to at least another section with a connector configured to allow for movement at a predetermined range.

15. The payload securement apparatus of claim 10, wherein the membrane includes any one of: a thermal insulative layer, a hydrophobic layer, an absorbent layer, a mesh, a fabric, a cord, a net, and a combination thereof.

16. The payload securement apparatus of claim 10, wherein the membrane includes an elastically deformable material.

17. The payload securement apparatus of claim 10, further comprising any one of: an adhesive, a magnet, a hook, a ring, a hook and loop fastener member, a fastener member, a clamp, and a combination thereof.

* * * * *